United States Patent
Knestel et al.

(10) Patent No.: US 11,073,443 B2
(45) Date of Patent: Jul. 27, 2021

(54) WIND TUNNEL BALANCE FOR MULTIPLE CONFIGURATION

(71) Applicant: AIP GMBH & CO. KG, Haldenwang (DE)

(72) Inventors: Anton Knestel, Hopferbach (DE); Thomas Becherer, Dietmannsried (DE)

(73) Assignee: AIP GMBH & CO. KG, Haldenwang (DE)

( * ) Notice: Subject to any disclaimer, the term of this patent is extended or adjusted under 35 U.S.C. 154(b) by 97 days.

(21) Appl. No.: 16/328,154

(22) PCT Filed: Aug. 11, 2017

(86) PCT No.: PCT/EP2017/070481
§ 371 (c)(1),
(2) Date: Feb. 25, 2019

(87) PCT Pub. No.: WO2018/036846
PCT Pub. Date: Mar. 1, 2018

(65) Prior Publication Data
US 2019/0195729 A1 Jun. 27, 2019

(30) Foreign Application Priority Data
Aug. 25, 2016 (DE) .................... 10 2016 216 052.4

(51) Int. Cl.
*G01M 9/06* (2006.01)
*G01M 17/007* (2006.01)

(52) U.S. Cl.
CPC ........ *G01M 9/062* (2013.01); *G01M 17/0074* (2013.01)

(58) Field of Classification Search
CPC .......... G01M 9/04; G01M 9/02; G01M 9/062; G01M 9/06; G01M 9/065; G01M 9/08;
(Continued)

(56) References Cited

U.S. PATENT DOCUMENTS

| 4,845,993 A | * | 7/1989 | Horne | G01M 9/062 73/147 |
| 5,663,497 A | * | 9/1997 | Mole | G01M 9/062 73/147 |

(Continued)

FOREIGN PATENT DOCUMENTS

| DE | 10 2008 036 315 A1 | 1/2010 |
| EP | 2 773 938 B1 | 3/2016 |

OTHER PUBLICATIONS

"FKFS—Modernisierung Windkanal," FKFS—Forschungsinstitut für Kraftfahrwesen und Fahrzeugmotoren Stuttgart, You Tube, May 6, 2015, [www.youtube.com/watch?v=acJy7jLcrQY].

(Continued)

*Primary Examiner* — Andre J Allen
(74) *Attorney, Agent, or Firm* — Oliff PLC

(57) ABSTRACT

A test bench, in particular a convertible wind channel balance, including a lifting frame for lifting at least one wheel belt unit, wherein the wheel belt unit has at least one belt which is looped around at least two rollers, a weighing platform, which is mounted so as to be relatively movable in relation to a test bench frame, at least one force sensing member arranged between the weighing platform and the test bench frame in order to sense forces between the weighing platform and the test bench frame, wherein at least one self-centering docking member is provided between an auxiliary frame and the weighing platform.

15 Claims, 10 Drawing Sheets

(58) Field of Classification Search
CPC ........... G01M 17/007; G01M 17/0074; G01M 9/067; G01M 10/00; G01M 15/14; G01M 17/0072; G01M 13/027; G01M 17/0076; G01N 15/02; G01N 15/0205; G01N 25/02; G01N 33/28; G01N 11/02; G01N 13/00; G01N 15/10; G01N 19/02; G01N 2011/0093; G01N 2015/1062
USPC .......................................................... 73/147
See application file for complete search history.

(56) References Cited

U.S. PATENT DOCUMENTS

| | | | | |
|---|---|---|---|---|
| 2007/0295883 | A1* | 12/2007 | Smith | G01M 9/02 248/589 |
| 2014/0303907 | A1* | 10/2014 | Roughen | G01M 9/062 702/41 |
| 2015/0000392 | A1* | 1/2015 | Knestel | G01M 17/0074 73/147 |
| 2016/0370257 | A1* | 12/2016 | Osterhage | G01M 17/007 |
| 2018/0038766 | A1* | 2/2018 | Knestel | G01M 9/062 |
| 2018/0045601 | A1* | 2/2018 | Hartmann | G01M 17/0074 |
| 2018/0067015 | A1* | 3/2018 | Vakili | G01M 9/04 |
| 2018/0335364 | A1* | 11/2018 | Skube | G01M 9/04 |

OTHER PUBLICATIONS

Nov. 29, 2017 International Search Report issued in International Patent Application No. PCT/EP2017/070481.

\* cited by examiner

WIND TUNNEL BALANCE FOR MULTIPLE CONFIGURATION

The invention relates to a test bench, in particular a convertible wind tunnel balance, which allows high-precision positioning of the test bench elements and, at the same time, their rapid replacement, e.g. through the use of self-centering docking devices.

So-called wind tunnel balances are used in wind tunnels to determine the aerodynamic influences. While on the road the vehicle is moved through a mostly stationary air over a stationary roadway, these variables are changed with the same result, i.e. the wind blows at driving speed and the base is also moved at driving speed while the vehicle is stationary. For the most part, so-called single-belt systems (rolling road) or five-belt systems are used.

In the case of such single-belt systems, the complete vehicle, including the wheels, is operated on a wide belt which is wider than the vehicle width. Such a test arrangement is described in EP 2 773 938 B1, for example. The great advantage of such single-belt systems is the real aerodynamic reproduction of the road vehicle behavior. A disadvantage is the costly restraint of the vehicle, which, in addition, can cause aerodynamic disturbances. Furthermore, the Z forces of the individual wheels must be determined through the moving wheel.

Single-belt test benches are used for so-called competition vehicles or correspondingly sporty production vehicles. Manufacturers who manufacture production vehicles and are also active with competition vehicles may wish to convert the test system from a single-belt to a five-belt system as quickly as possible and vice versa.

In contrast to single-belt systems, five-belt systems do not have a perfect base simulation because only the belt between the wheels is moved at wind speed. In the case of various sporty production vehicles it can also be useful to carry out the tests on a five-belt and a single-belt test bench.

DE 10 2008 036 315 A1 describes a test bench in which individual parts of the test bench can be altered. For example, the four wheel belt units of a five-belt system can be replaced individually, while the center belt remains stationary. This document mentions mechanically locking quick coupling mechanisms that connect the exchangeable wheel or side belts to the weighing platform.

Such quick couplings, however, are only suitable to a limited extent for the precise stationary connection between two parts, as is of decisive importance for wind tunnel balances, for example. Such test benches, for example wind tunnel balances, must be able to determine six components, namely three forces FX, FY and FZ as well as three torques MX, MY and MZ. The torques are naturally determined from the measured forces and the associated lever arms. It is therefore of great importance that the replaceable test bench components can be installed in such a way that they are as reproducible and precise as possible. Furthermore, the necessary changeover time is also of decisive importance for the economic efficiency of the system.

It is therefore an object of the invention to create a test bench, in particular a convertible wind tunnel balance, which allows high-precision positioning and rapid replacement of the test bench elements.

This object is achieved one the basis of the features of the independent claim. The dependent claims relate to advantageous embodiments and further developments of the invention.

According to the invention, the test bench, in particular a convertible wind tunnel balance, can have a lifting frame for lifting at least one wheel belt unit. The wheel belt unit can have at least one conveyor belt looped around at least two rollers. A weighing platform can be provided and is mounted so as to be relatively movable in relation to a test bench frame. At least one force sensing means can be provided which is located between the weighing platform and the test bench frame to sense forces between the weighing platform and the test bench frame. Furthermore, at least one self-centering docking device can be provided between an auxiliary frame and the weighing platform.

The use of self-centering docking devices makes it possible to install replaceable test bench components with a very high degree of reproducibility and high precision and with short changeover times.

The test bench according to the invention is designed in such a way that an auxiliary frame on which the wheel belts are mounted and the central conveyor belt can be lifted with one lifting operation. In a second operation, the single-belt unit can then be lowered into a free floor opening of the test bench or the wind tunnel balance by means of a lowering operation (and vice versa).

The wheel belt units can be frictionally and/or positively connected to the balance or weighing platform, while the central conveyor belt and the test bench cover or lifting frame are supported in a fixed position. When the test bench cover or the lifting frame is lifted together with the central conveyor belt, an auxiliary frame can be lifted together with the wheel belts or side-belt units after a few centimeters, so that the single-belt unit can then be inserted at this place with just one lowering operation.

As already mentioned, the wheel belt units can be frictionally and/or positively connected to the weighing platform. The dead weight of the wheel belt units or their mounting frames is sufficient to ensure a fixed position. In addition, the aerodynamic output forces increase the pressure on the separating parts (self-centering docking means).

In the test bench according to the invention, all wheel belt units can be connected to a frame in fixed fashion, which can then be connected to the balance via the self-centering docking means. This allows the above-mentioned advantages of the invention, namely that a high-precision positioning and at the same time a quick exchange of the test bench elements can be made possible.

According to the invention, the at least one docking member can include a first docking device and a second docking device. The first docking device can be provided on an auxiliary frame, the second docking device can be provided on a weighing platform, wherein the first and the second docking device can mesh in a self-centering manner when the lifting frame is lowered.

As a result, high-precision positioning of the test bench elements becomes possible. The type and form of these docking members or the docking devices can be diverse. Substantially, these can be corresponding protrusions, which in turn engage in corresponding receptacles in such a way that high-precision self-centering and meshing are made possible.

Examples would be a truncated cone-shaped design or a cutting-pan-like design of the corresponding docking members. However, it should be expressly noted here that other forms and types of docking members are also possible.

Furthermore, a carrier can be provided which can establish a connection between the auxiliary frame and the lifting frame to lift the auxiliary frame. This means that when the lifting frame is lifted, the auxiliary frame can also be lifted with the wheel belt units connected to it. When the auxiliary frame and the lifting frame are in a set-down position, the auxiliary frame and the lifting frame are non-contacting. This ensures that no forces are transmitted between the auxiliary frame and the lifting frame, which might falsify the measurement of the forces and moments.

For example, the carrier can have a carrier head which is extended compared to a carrier neck and can come into contact with an upper side of a transverse strut of the lifting frame when the lifting frame is lifted. This allows the carrier to be pulled upwards when the lifting frame is lifted or moved. As a result, the auxiliary frame can be lifted as well since it can be connected to the carrier.

The carrier neck can be arranged in a hole in the transverse strut with clearance in such a way that there is no contact between the auxiliary frame and the lifting frame in the non-lifted state and no forces are transmitted between the auxiliary frame and the lifting frame. The opening in the transverse strut or the hole in the transverse strut, through which the carrier or the carrier neck passes, should be large enough to prevent any contact between the auxiliary frame and the lifting frame after it has been set down.

The carrier can also be designed as a chain or rope, for example, but here, too, without contact between the auxiliary frame and the lifting frame in the set-down state.

The at least one wheel belt unit can be a single-belt unit, a center belt unit and/or at least one side belt unit. In particular, a five-belt unit can be provided, which has four side belt units and a center belt unit. Furthermore, a single-belt unit can be inserted into the test bench after the five-belt unit has been removed (as mentioned above).

The force sensing members according to the invention are designed in such a way that six components, namely three forces in the X, Y and Z directions as well as three torques MX, MY and MZ can be determined.

As mentioned above, the auxiliary frame can be connected to the weighing platform when docked and the lifting frame can be connected to the test bench frame when mounted.

In summary, the invention allows high-precision positioning of the test bench elements and a rapid replacement of the test bench elements. This makes it possible to realize a very advantageous test bench, in particular a convertible wind tunnel balance, which allows a simple and highly accurate multiple configuration. In particular when reconfiguring from a five-belt configuration to a single-belt configuration and back, this can be done with short changeover times while simultaneously ensuring high-precision positioning of the individual test bench elements.

Various examples of the device according to the invention are described below with reference to the attached schematic drawings, wherein FIG. 1 shows a perspective view of a five-belt system;

Figure 1:
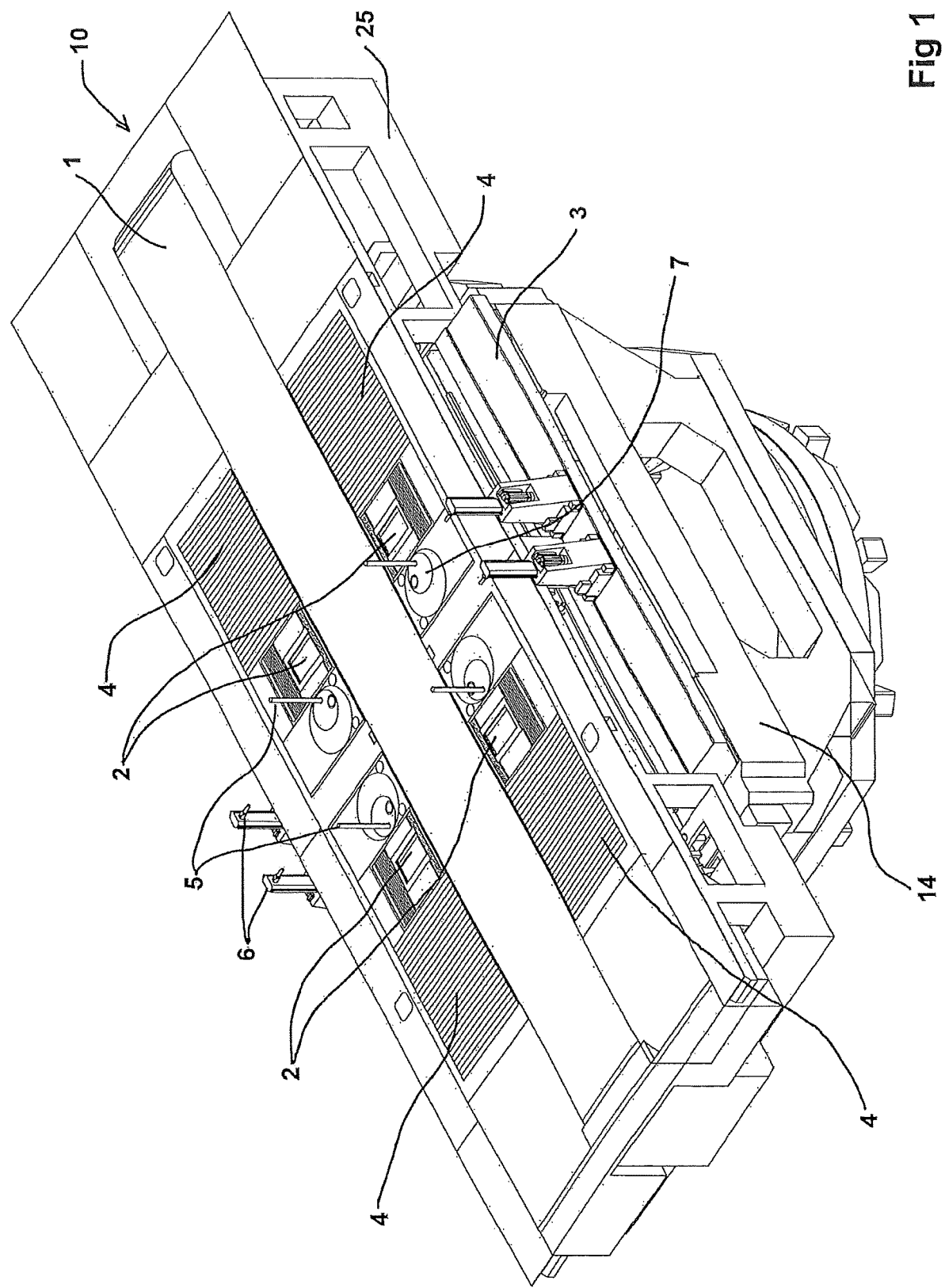

FIG. 1 shows a five-belt unit 10. The center shows the so-called central belt unit 1 is shown. Furthermore, wheel belt units 2 are provided. These wheel belt units 2 are arranged where the vehicle wheels of the vehicle to be tested rest. The wheel belt units 2 are frictionally connected to a weighing platform 3 while the central conveyor belt 1 and a decking 4 and the lifting frame 25 are supported on the test bench frame 14.

Decking 4 can be understood as the complete test bench surface with the exception of the belt units.

In order to hold the vehicle in place during the measurement, either so-called rocker panel supports 5 or external fixing devices 6 are used. The rocker panel supports 5 can be adapted to the vehicle position via so-called planetary gears 7 without having to remove and/or install any molded parts. The rocker panel 5 restraint allows very fast vehicle fixation, which is also located in the slipstream of the wheels and therefore provides only minimal false information due to the incoming airflow. In addition, this type of vehicle restraint can be realized in fully automated fashion.

However, a vehicle fixation can also be carried out via the fixation devices 6. The vehicle is here connected to the fixing devices 6 or posts via rods and/or ropes. The attachment to the vehicle can here be carried out at the wheel hubs or at the car body.

Figure 2:
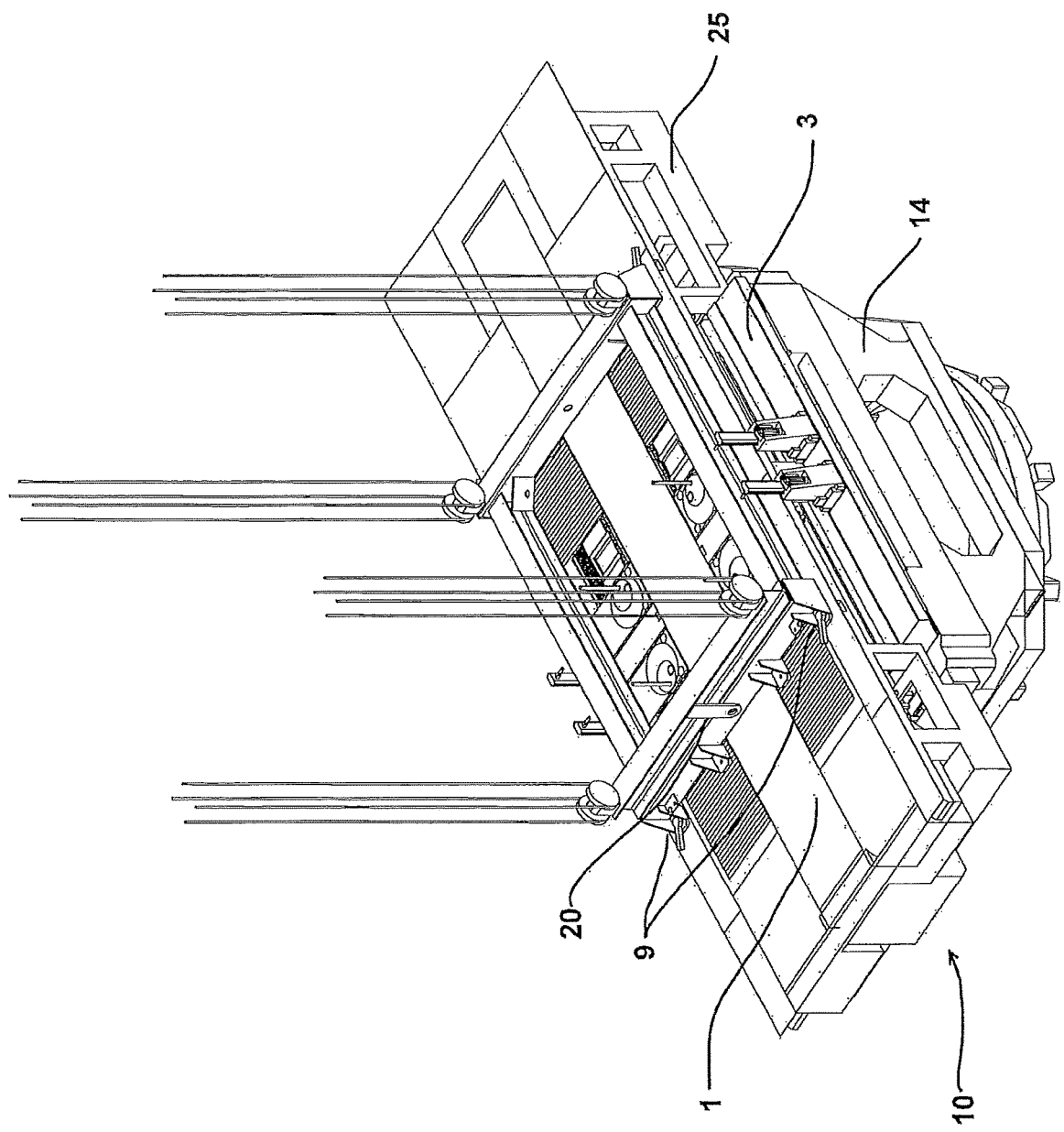
FIG. 2 shows a perspective view of this five-belt unit with a transverse lifting strut arranged on it.
Figure 3:
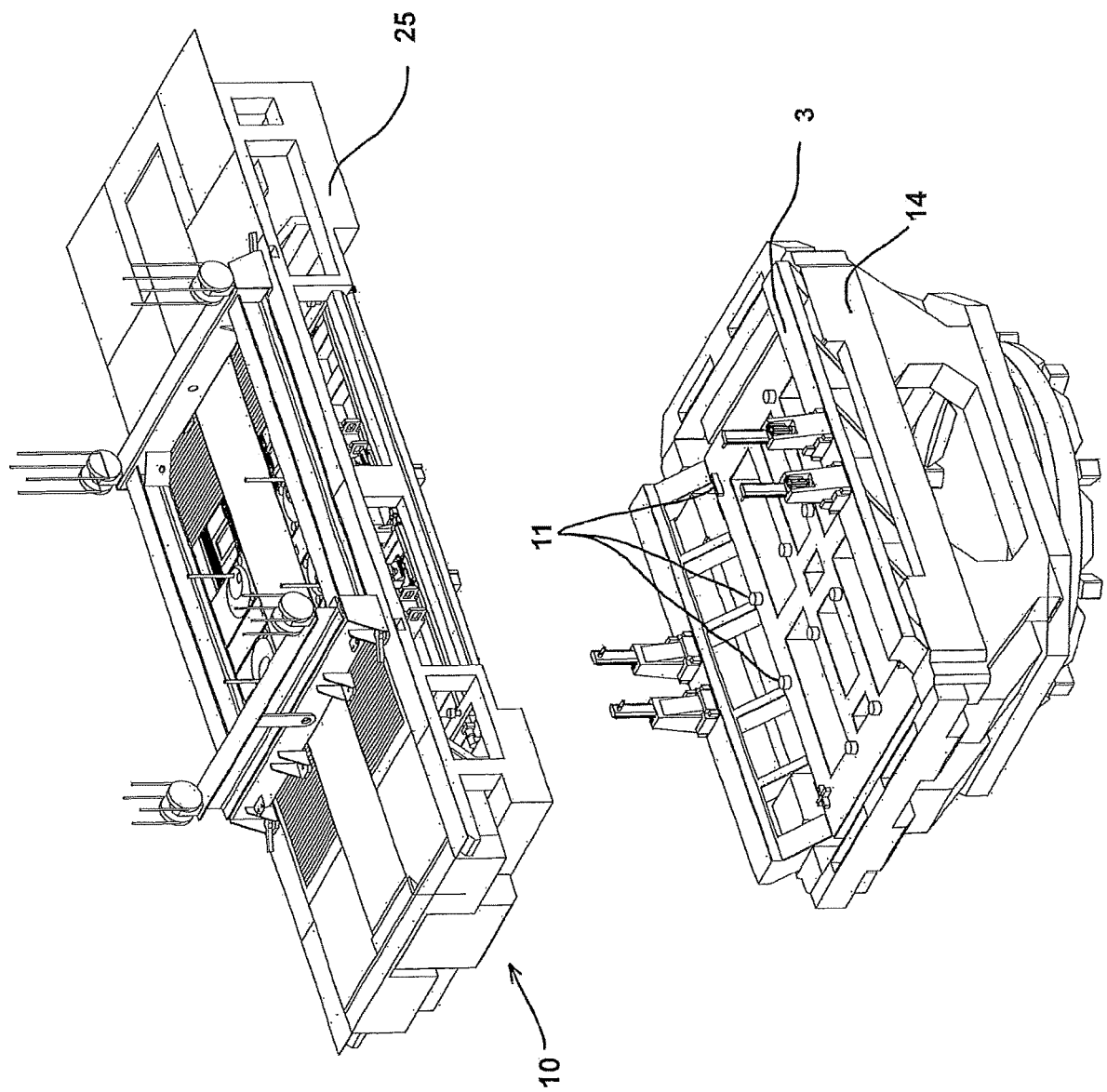
FIG. 3 shows a perspective view of a lifted five-belt unit.

FIG. 2 shows the five-belt unit 10 with a transverse lifting strut 20. This transverse lifting strut 20 can be connected to the lifting frame 25 via bayonet locks 9 or threaded bolts, for example. By using bayonet locks 9, for example, both parts can be quickly locked to each other, which can also lead to shorter changeover times. During the lifting process, the lifting frame 25 is first lifted together with the central belt unit 1. Then, a positive engagement allows the side belt units 2, i.e. the inner part of the convertible wind tunnel balance, to be lifted as well. This allows complete lifting of the five-belt unit 10 in one lifting operation.

Figure 4A:
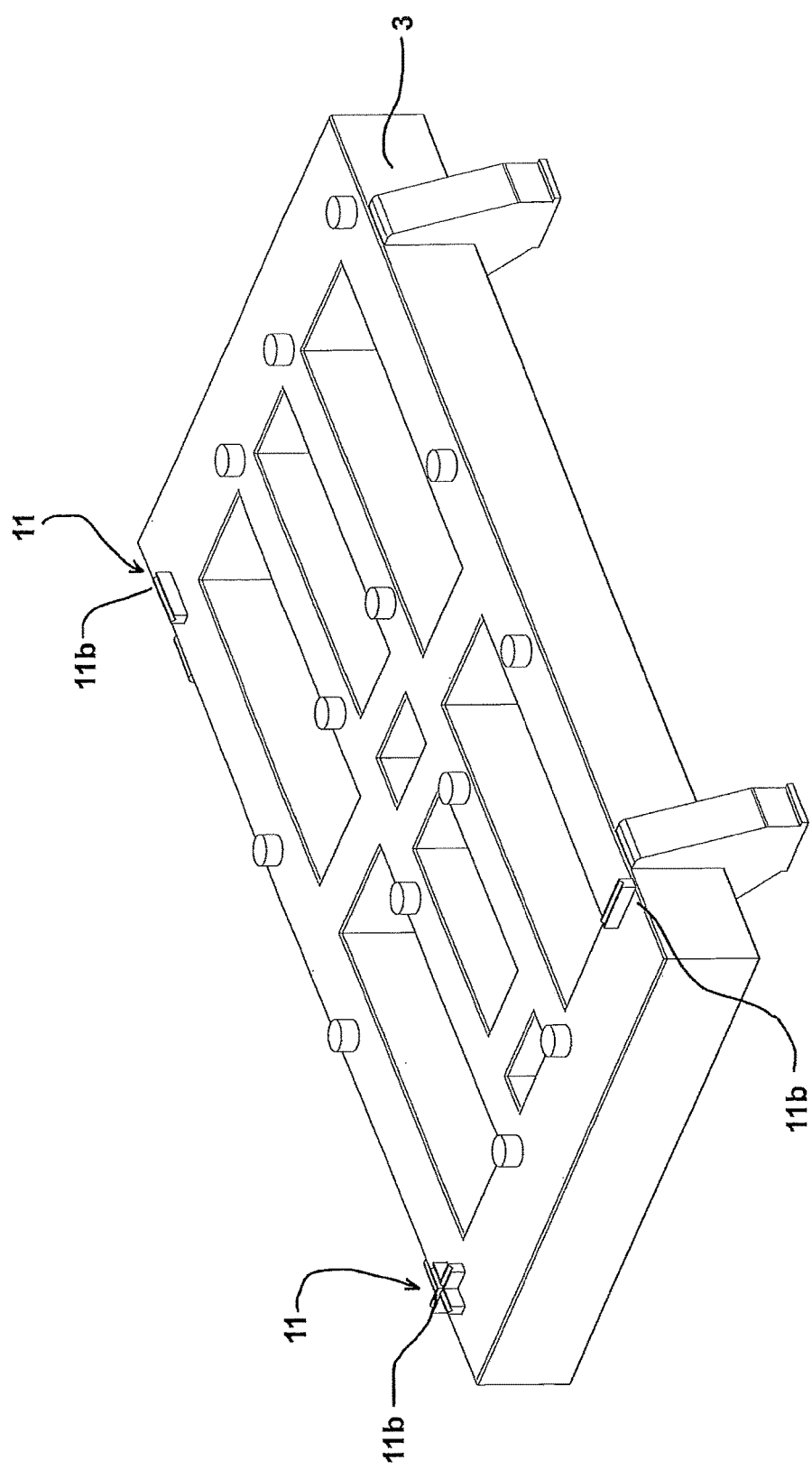
FIG. 4a shows a perspective view of an upper part of a weighing platform with corresponding docking members or examples of second docking devices.

FIG. 4a shows an upper part of the weighing platform 3. The weighing platform 3 includes examples of docking members 11. Examples of second docking devices 11b are also shown. These are, for example, second docking devices 11b in the form of a cutting pan.

Figure 4B:
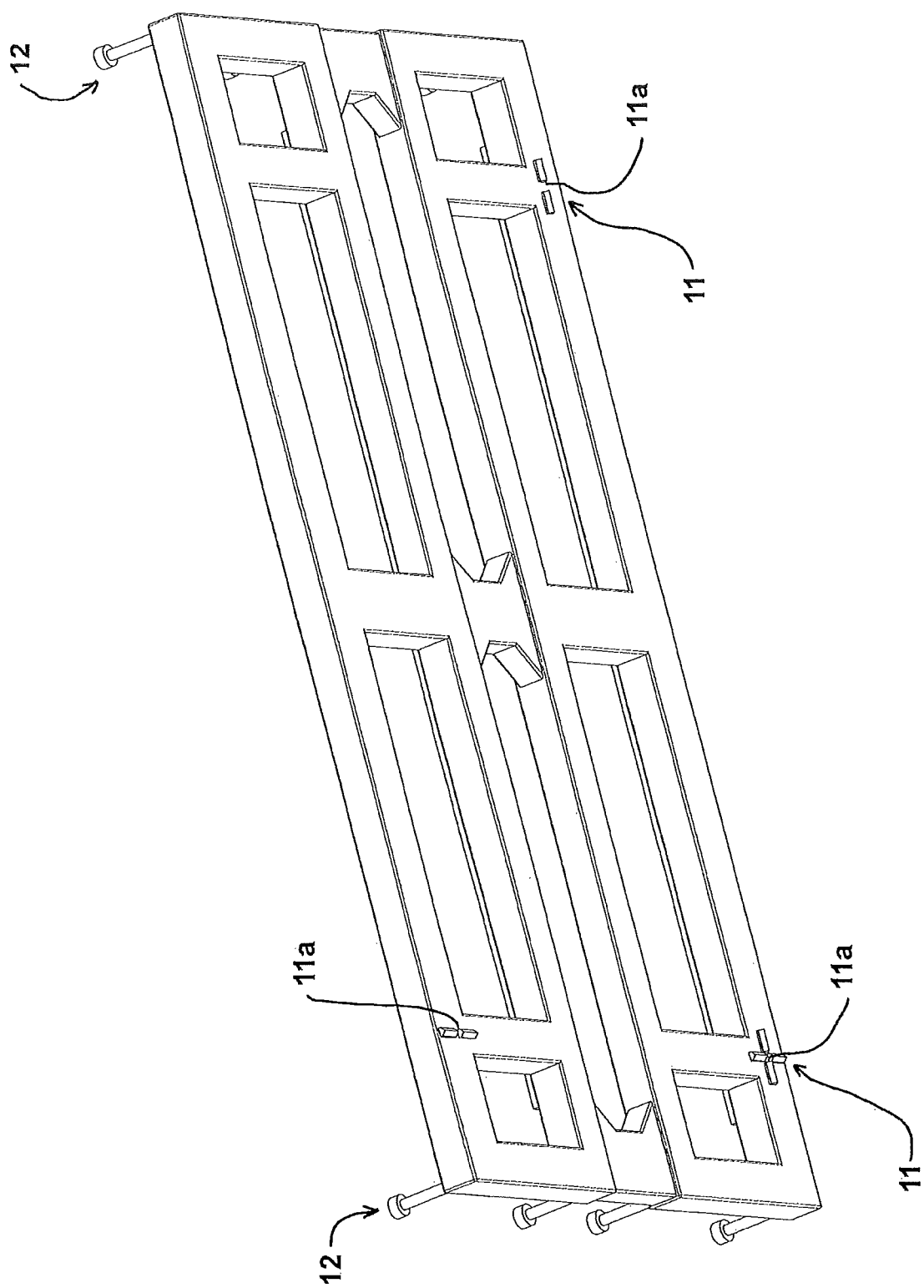
FIG. 4b shows a perspective view of an auxiliary frame with examples of docking members or first docking devices and corresponding carriers.

FIG. 4b shows a counterpart to FIG. 4a, namely the auxiliary frame 13 with docking members 11 arranged thereon and the counterparts to the second docking devices 11b, namely the first docking devices 11a. These are, for example, the first docking devices 11a in the form of a cutting edge. This figure also shows examples of carriers 12 (see FIG. 6).

The corresponding docking members 11 can also be arranged crosswise, for example. Furthermore, there can be positioning advantages if three such docking members 11 are provided.

Figure 5:
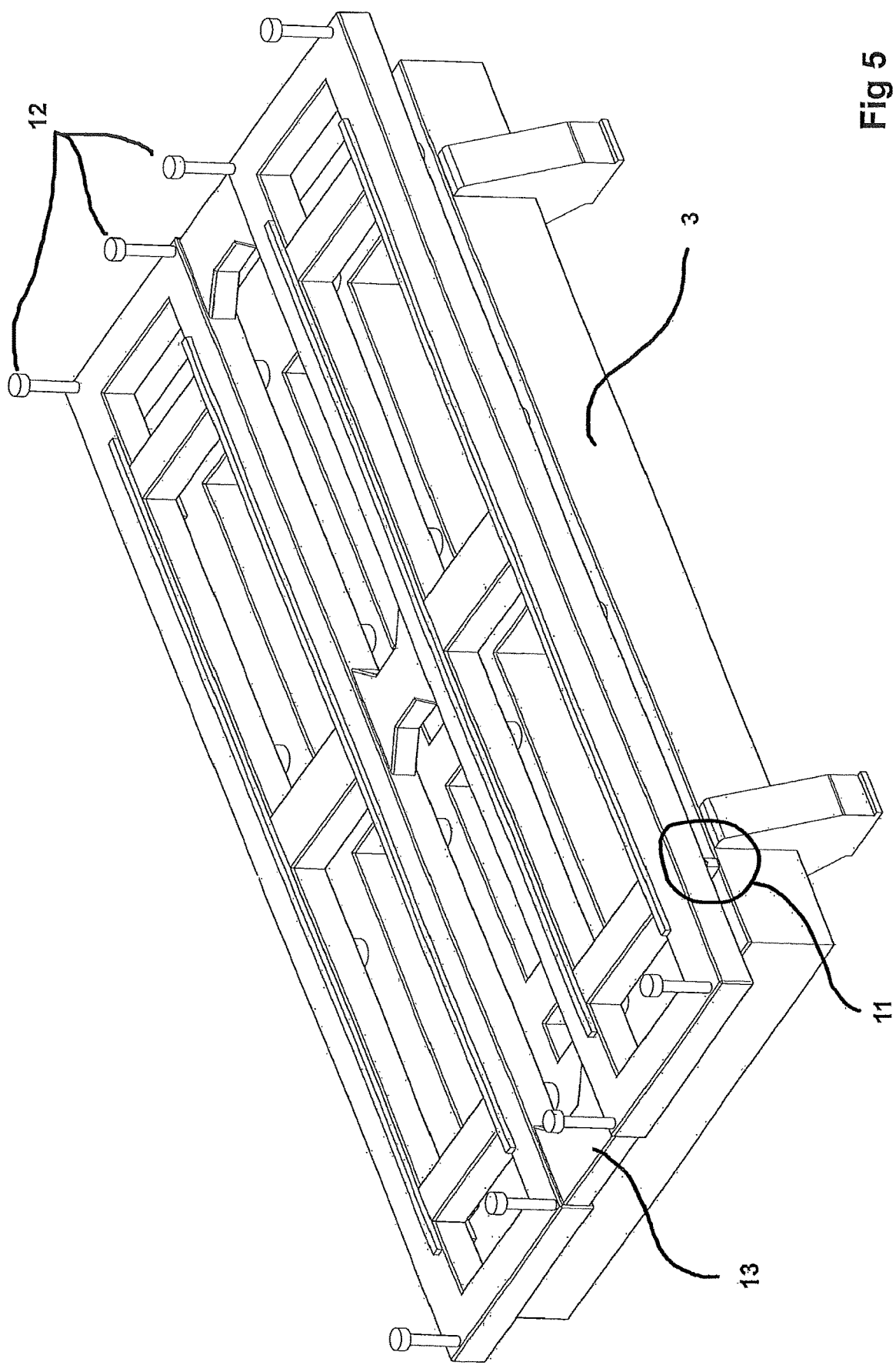
FIG. 5 shows a perspective view of a weighing platform with a set-down auxiliary frame and corresponding carriers.

FIG. 5 shows the weighing platform 3 with an auxiliary frame 13 arranged thereon. Also to be seen are the docking members 11, which interlock in self-centering fashion in the form of first and second docking devices 11a, 11b. In addition, the carriers 12 are also shown here.

Figure 6:
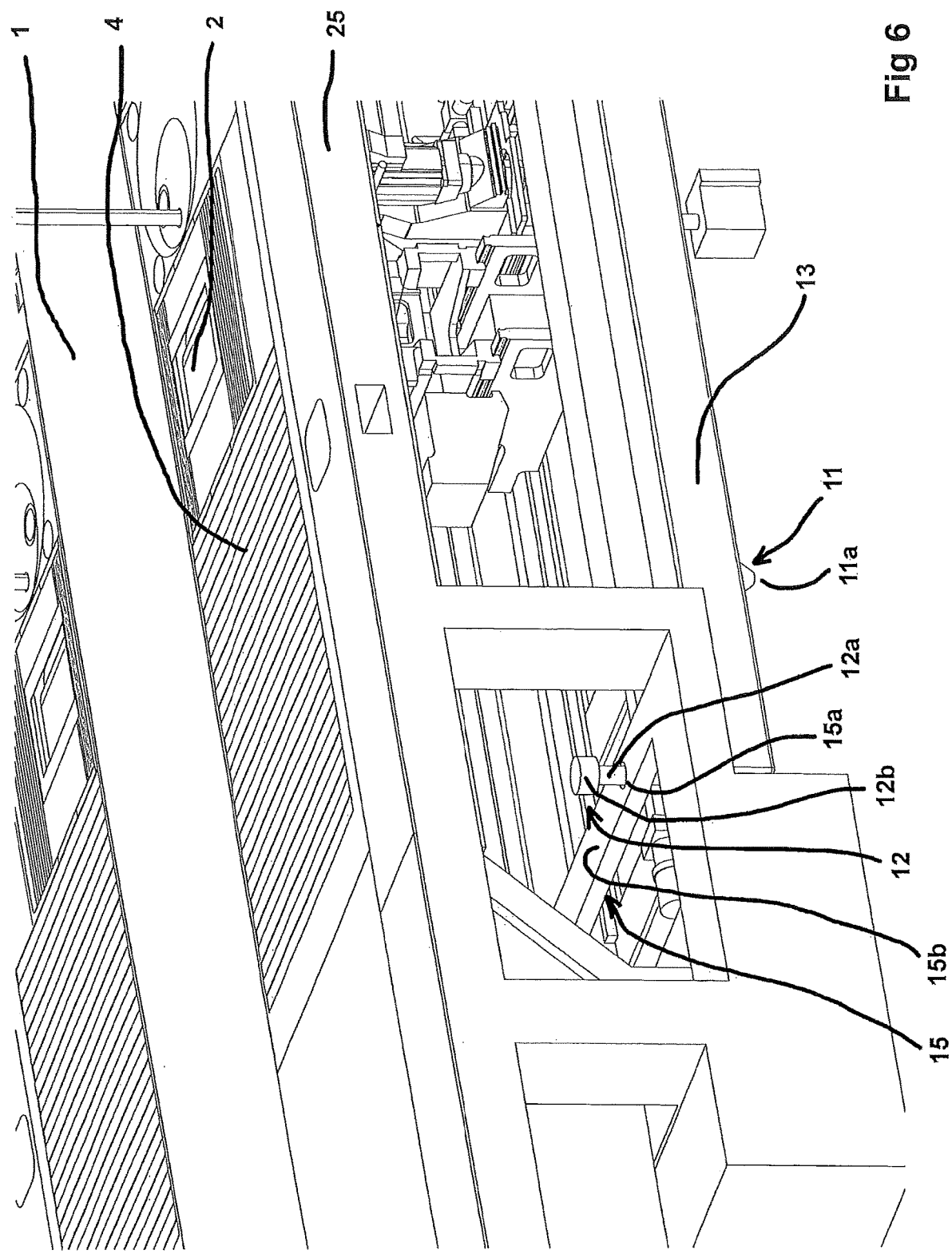
FIG. 6 shows a perspective view of a section of a five-belt unit.

FIG. 6 shows the auxiliary frame 13 with a first docking device 11a on the underside. In addition, carriers 12 are shown which are connected to the auxiliary frame 13. In this example, the carriers 12 have a carrier neck 12a and a carrier head 12b. The carrier neck 12a is arranged with clearance in a hole 15a of a transverse strut 15 of the lifting frame 25. It should be emphasized that when the auxiliary frame 13 and the lifting frame 25 are in the set-down position, there is no contact between the auxiliary frame 13 and the lifting frame 25. This means that the hole 15a in the transverse strut 15 is dimensioned in such a way that there is no radial contact and, of course, no axial (or other) contact in the set-down position with the transverse strut 15. This ensures that no measurement falsifications occur.

If the lifting frame 25 is now lifted (upwards), the transverse strut 15 (with the lifting frame 25) first moves upwards and relative to the still stationary auxiliary frame 13 and the still stationary carriers 12. After a few centimeters, e.g. an upper side 15b of the transverse strut 15 comes into contact with the carrier head 12b and also lifts the auxiliary frame 13 with the wheel belt units arranged thereon as it continues to move upwards. This ensures that all elements of the five-belt unit 10 can also be lifted in one lifting operation.

As shown in FIG. 6, the carriers 12 ensure that, when lifting the lifting frame, the auxiliary frame 13 is also lifted for the first time after a few centimeters of lifting movement. Similarly, when the five-belt unit 10 is lowered, the connection is first established via the self-centering docking members 11 and when it is lowered further, the connection to the test bench frame 14 is established. It should again be mentioned here that only the auxiliary frame 13 is placed on the weighing platform 3 via the self-centering docking members 11 but the central belt unit 1 and the lifting frame 25 are fixed to the test bench frame 14. Consequently, a rotatable arrangement of the test bench frame 14 with wheel belt units 1, 2 arranged thereon is possible (see e.g. FIG. 1).

Figure 7:
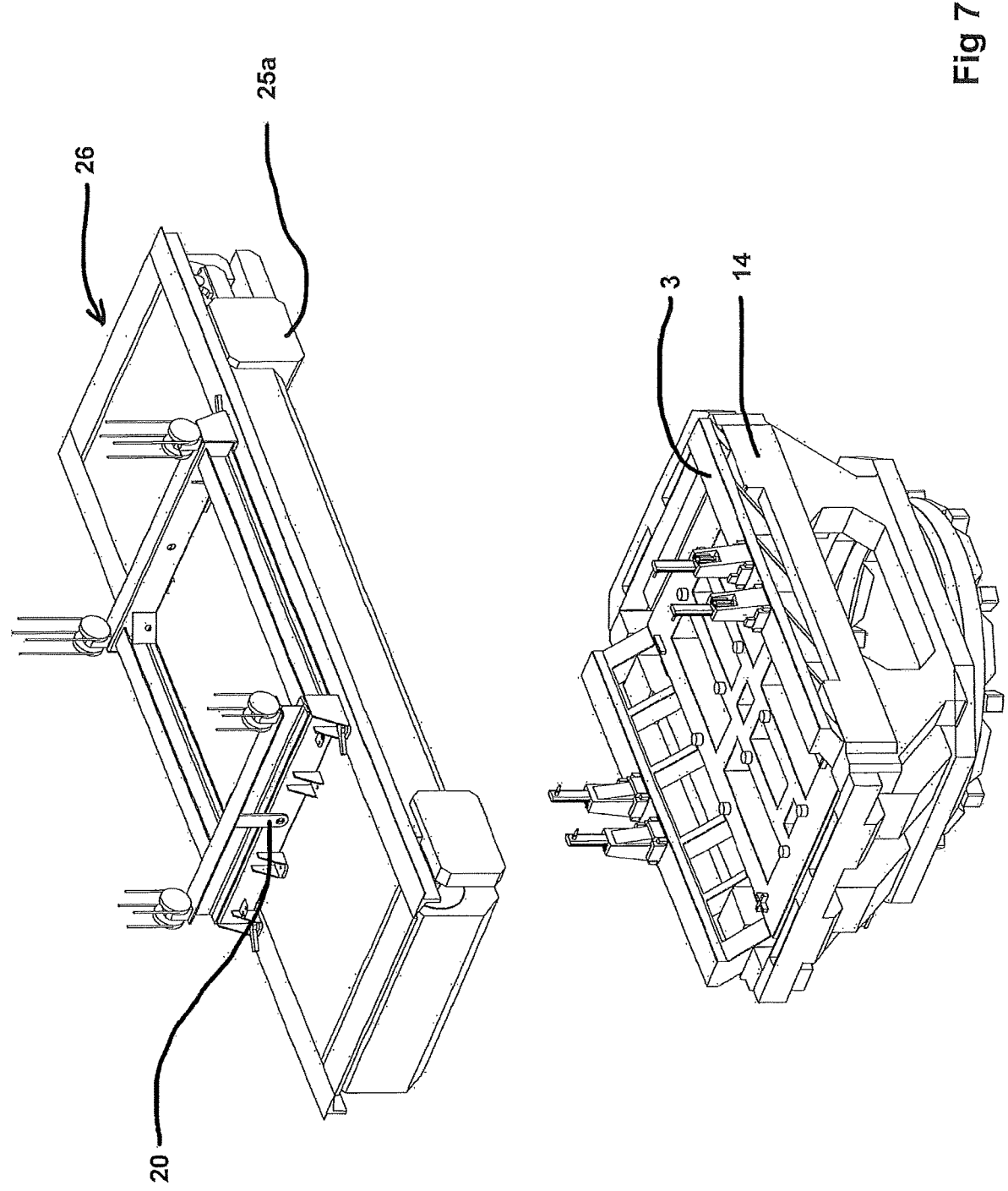
FIG. 7 shows a perspective view of a lifted single-belt unit.

FIG. 7 shows a single-belt unit 26, which is in a lifted condition. In addition, a lifting frame 25a of the single-belt unit 26 is also shown.

Figure 8:
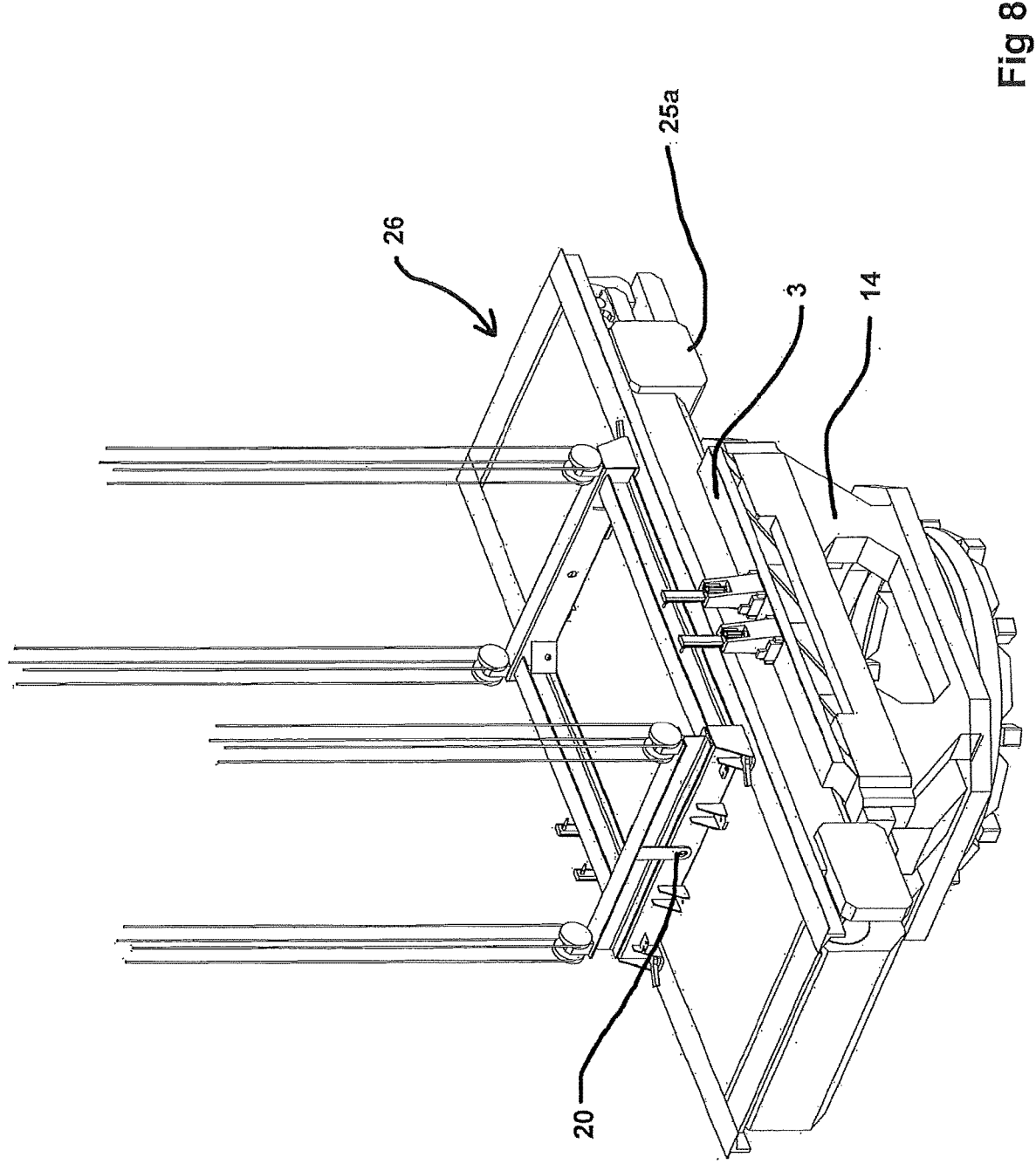
FIG. 8 shows a perspective view of a mounted single-belt unit with a transverse lifting strut attached thereto.

FIG. 8 shows the single-belt unit 26 in a set-down state, with the transverse lifting strut 20 arranged thereon.

With regard to the single-belt unit 26 shown in FIGS. 7 and 8, it should be noted that a frictional connection is only established in the X and Y directions. The Z force component is supported here on the unweighted part (test bench frame 14). An additional sensing member can here also be provided between the single-belt unit 26 and the weighing platform 3 to compensate for friction and venting losses.

Figure 9:
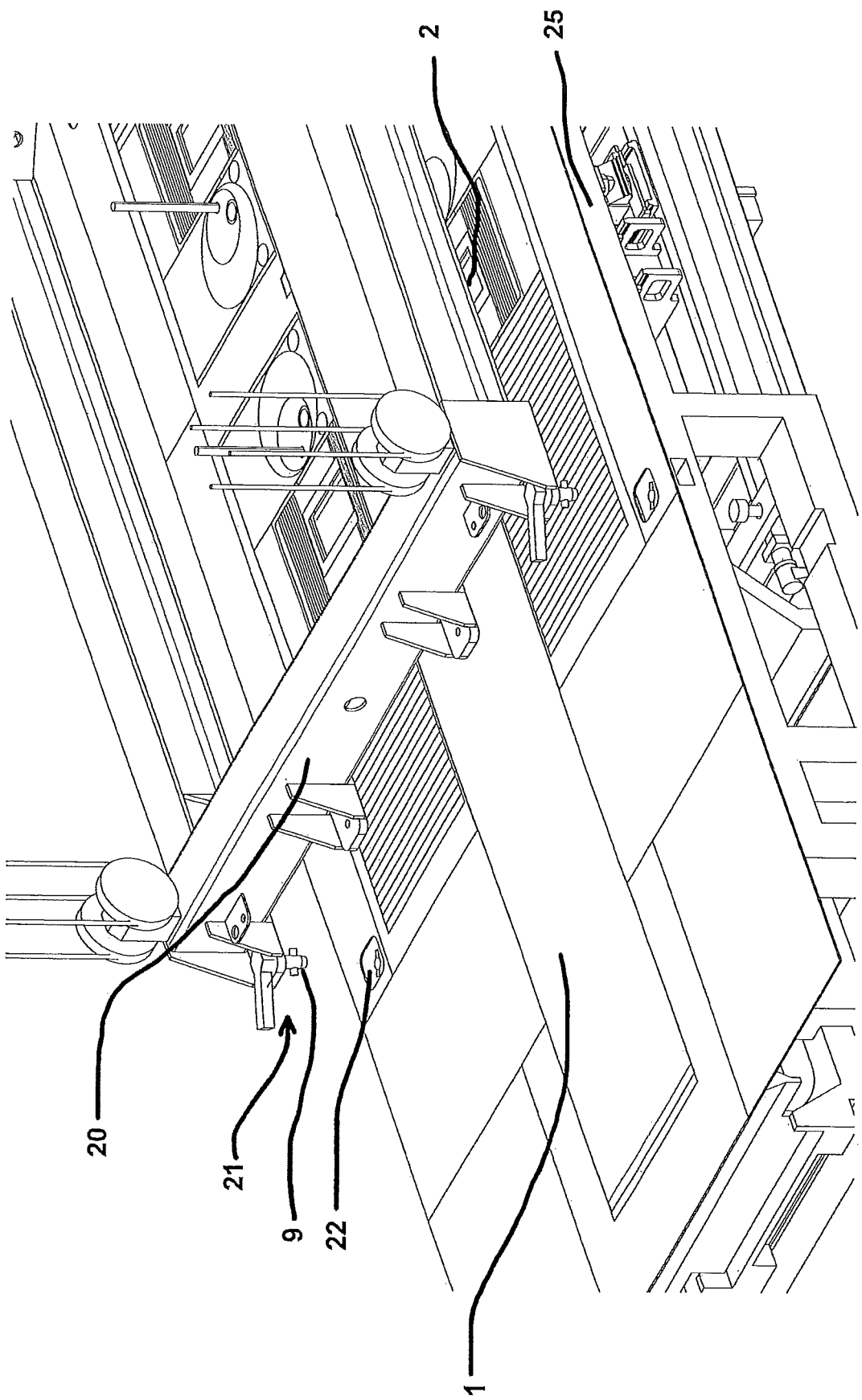
FIG. 9 shows a more detailed view of the transverse lifting strut or a crane suspension with latches arranged thereon.

FIG. 9 shows a detailed view of the transverse lifting strut 20 with the latches 21 arranged thereon, for example with bayonet locks 9. These latches 21 can engage in the connections 22 provided for this purpose on the lifting frame 25, 25a and can be locked by interlocking or twisting. The same applies to the single-belt unit 26 shown in FIGS. 7 and 8.

By providing the latches, a quick connection can be established between the crane suspension 20 and the respective test bench, so that the replacement times can be minimized.

In summary, the present invention can be used to realize a very advantageous test bench, in particular a convertible wind tunnel balance, which allows high-precision positioning of the individual test bench elements with very short changeover times. This reduces very short changeover times e.g. between a five-belt unit 10 and a single-belt unit 26, while, at the same time, ensuring very precise positioning of the relevant elements.

The invention claimed is:

1. A test bench, in particular a convertible wind tunnel balance, comprising
   a lifting frame for lifting at least one wheel belt unit, the wheel belt unit having at least one belt which is looped around at least two rollers,
   a weighing platform which is mounted so as to be relatively movable in relation to a test bench frame,
   at least one force sensing member arranged between the weighing platform and the test bench frame for sensing forces between the weighing platform and the test bench frame,
   wherein:
   at least one self-centering docking member is provided between an auxiliary frame and the weighing platform, and
   the auxiliary frame is arranged between the weighing platform and the lifting frame in a set-down state of the auxiliary frame.

2. The test bench according to claim 1, wherein the at least one docking member contains a first docking device and a second docking device.

3. The test bench according to claim 2, wherein the first docking device is provided on the auxiliary frame and the second docking device is provided on the weighing platform, wherein the first and second docking devices engage in one another in a self-centering manner when the lifting frame is lowered.

4. The test bench according to claim 1, wherein the at least one docking member is designed as a truncated cone with a counterpart.

5. The test bench according to claim 1, wherein the at least one docking member is designed as a cutting pan, wherein a first docking device is provided in the form of a cutting edge and a second docking device is provided in the form of a cutting pan.

6. The test bench according to claim 1, wherein at least one carrier is provided which establishes a connection between the auxiliary frame and the lifting frame for lifting the auxiliary frame, in order to also lift the auxiliary frame with the wheel belt units connected thereto when the lifting frame is lifted, the auxiliary frame and the lifting frame being non-contacting in the set-down state of the auxiliary frame and the lifting frame and the auxiliary frame being connected to the weighing platform.

7. The test bench according to claim 6, wherein the carrier has a carrier head, which is enlarged in comparison with a carrier neck and which comes into contact with an upper side of a transverse strut of the lifting frame when the lifting frame is lifted.

8. The test bench according to claim 7, wherein the carrier neck is arranged with clearance in a hole of the transverse strut in such a way that in a non-lifted state there is no contact between the auxiliary frame and the lifting frame and no forces are transmitted between the auxiliary frame and the lifting frame, wherein the auxiliary frame is connected to the weighing platform in the set-down state.

9. The test bench according to claim 6, wherein the carrier is designed as a chain or cable and is connected to the auxiliary frame and the lifting frame in such a way that in a non-lifted state there is no contact between the auxiliary frame and the lifting frame and no forces are transmitted between the auxiliary frame and the lifting frame.

10. The test bench according to claim 6, wherein the carrier is connected to the auxiliary frame.

11. The test bench according to claim 1, wherein the auxiliary frame is connected to the at least one wheel belt unit.

12. The test bench according to claim 1, wherein the at least one wheel belt unit is a single-belt unit, a central belt unit and/or at least one side belt unit.

13. The test bench according to claim 12, wherein, when the lifting frame is lifted, the central belt unit connected to it is lifted and the at least one side belt unit is lifted via the auxiliary frame.

14. The test bench according to claim 1, wherein the auxiliary frame is connected to the weighing platform in the docked state.

15. The test bench according to claim 1, wherein the lifting frame is connected to the test bench frame in the mounted state.

* * * * *